K. Thoman,

Canteen,

Nº 52,468,   Patented Feb. 6, 1866.

Witnesses;
W. H. Burridge
Frank Alden

Inventor;
K. Thoman

UNITED STATES PATENT OFFICE.

KATHRIN THOMAN, OF CLEVELAND, OHIO.

CANTEEN AND LUNCH-BOX.

Specification forming part of Letters Patent No. 52,468, dated February 6, 1866.

*To all whom it may concern:*

Be it known that I, KATHRIN THOMAN, of Cleveland, in the county of Cuyahoga and State of Ohio, have invented certain new and useful Improvements in a Portable Heater and Canteen Combined; and I do hereby declare the following is a full and complete description of the same, reference being had to the accompanying drawings, in which—

Figure 1:
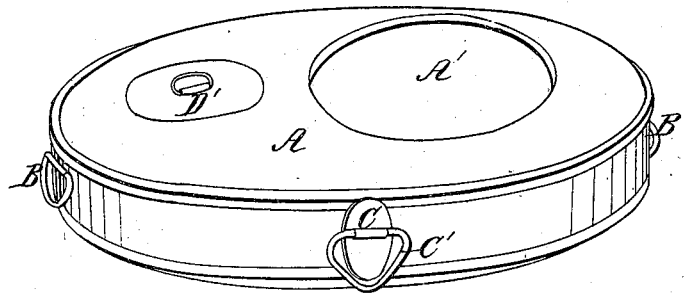
Figure 2:
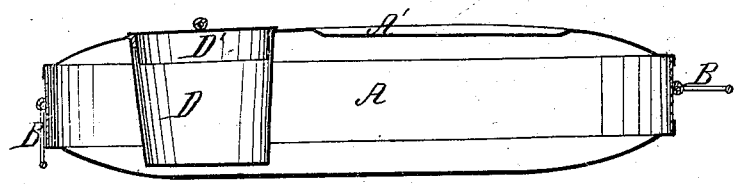

Figure 1 is a perspective view of the heater. Fig. 2 is a longitudinal section.

Like letters of reference refer to like parts in the views.

My improvement relates to a portable heater and canteen combined, which may be used for the purpose of carrying warm or cold drinks or provisions, and for the purpose of warming the feet, and can also be used as a remedial agent where warm or hot applications are required.

A represents the heater or case, of an oblong oval form, (represented in the drawings,) which may be of any other desired configuration, and is made of tin, copper, or any suitable material. This heater can be used as a canteen by having a strap attached to the handles B B and hung over the shoulders for carrying either warm or cold drinks. These handles B B are attached to each end of the case, which are very convenient in carrying, particularly when the case is filled with hot water for any desirable purpose.

There is a screw, C, seen at the side of the case, but which can be put in any part as desired. In filling this case the screw is to be taken out. The handle C′ attached to the screw can be used to aid in carrying.

When it is desired to heat or keep warm provisions they are put into the chamber or cavity D, (seen in Fig. 2,) of which there may be one or more, and the water surrounding this chamber on both sides and bottom, and which is in the case, will heat the chamber, thus warming the food, the cover D′ keeping the heat from passing out.

The heater can be used as a remedial agent by applying it externally, when warm, to the parts affected, for warming the feet or hands, and also for warming beds. When the case is filled with hot water it is too warm to handle, then the handles B B can be used, which are very convenient for this purpose.

A′ of the heater, which is a part of it depressed, can be used for several purposes, as a platter on which food can be put to be kept warm, or on which anything can be put for the purpose of heating.

It is obvious that the heater can be used for many different purposes not mentioned, and made of various forms suitable for the purpose desired.

What I claim as my improvement, and desire to secure by Letters Patent, is—

The arrangement of the chamber D, with its cover, and the recess or depression A′, in combination with the heater or case A and screw C, constructed as and for the purposes set forth.

KATHRIN THOMAN.

Witnesses:
W. H. BURRIDGE,
AUGUST RAAB.